United States Patent
Ahn et al.

(10) Patent No.: US 11,018,349 B2
(45) Date of Patent: May 25, 2021

(54) CATALYST FOR OXYGEN REDUCTION ELECTRODE AND METHOD FOR MANUFACTURING SAME

(71) Applicant: FOUNDATION FOR RESEARCH AND BUSINESS, SEOUL NATIONAL UNIVERSITY OF SCIENCE AND TECHNOLOGY, Seoul (KR)

(72) Inventors: Hyo-Jin Ahn, Seoul (KR); Geon-Hyoung An, Yongin-si (KR); Eun-Hwan Lee, Seoul (KR); Kyung-Won Park, Seoul (KR); Jung-In Sohn, Dangjin-si (KR)

(73) Assignee: FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 447 days.

(21) Appl. No.: 15/750,777

(22) PCT Filed: Dec. 8, 2015

(86) PCT No.: PCT/KR2015/013400
§ 371 (c)(1),
(2) Date: Feb. 6, 2018

(87) PCT Pub. No.: WO2017/022900
PCT Pub. Date: Feb. 9, 2017

(65) Prior Publication Data
US 2018/0375107 A1    Dec. 27, 2018

(30) Foreign Application Priority Data
Aug. 6, 2015 (KR) .................. 10-2015-0111192

(51) Int. Cl.
*H01M 4/92* (2006.01)
*H01M 4/96* (2006.01)
(Continued)

(52) U.S. Cl.
CPC ............ *H01M 4/923* (2013.01); *D01D 5/003* (2013.01); *D01F 1/10* (2013.01); *D01F 9/14* (2013.01);
(Continued)

(58) Field of Classification Search
CPC .................................. H01M 4/9083
See application file for complete search history.

(56) References Cited

U.S. PATENT DOCUMENTS
2016/0248102 A1* 8/2016 Liu .................. H01M 10/0525

FOREIGN PATENT DOCUMENTS
JP     2004-207228 A    7/2004
KR  10-2008-0094916 A  10/2008
(Continued)

OTHER PUBLICATIONS

International Search Report for PCT/KR2015/013400 dated Apr. 22, 2016, citing the above references.

*Primary Examiner* — Stephan J Essex
(74) *Attorney, Agent, or Firm* — Hauptman Ham, LLP

(57) ABSTRACT

The present invention relates to a non-platinum catalyst for an oxygen reduction electrode, in which iron nanoparticles are dispersed in nitrogen-doped mesoporous carbon nanofibers, and the surfaces of the iron nanoparticles are at least partially exposed to the outside. In addition, the present invention relates to a method for producing a non-platinum catalyst for an oxygen reduction electrode using electrospinning and hydrogen activation reactions.

6 Claims, 11 Drawing Sheets

(51) Int. Cl.
  *H01M 8/02* (2016.01)
  *H01M 8/10* (2016.01)
  *D01D 5/00* (2006.01)
  *H01M 4/90* (2006.01)
  *D01F 1/10* (2006.01)
  *D01F 9/14* (2006.01)

(52) U.S. Cl.
  CPC ....... *H01M 4/9041* (2013.01); *H01M 4/9083* (2013.01); *H01M 4/926* (2013.01); *H01M 4/96* (2013.01); *H01M 8/02* (2013.01); *H01M 8/10* (2013.01)

(56) References Cited

FOREIGN PATENT DOCUMENTS

| | | | | |
|---|---|---|---|---|
| KR | 20080094916 A | * | 10/2008 | ............ D06M 11/05 |
| KR | 10-2012-0058193 A | | 6/2012 | |
| KR | 20120058193 A | * | 6/2012 | .......... H01M 4/9083 |
| KR | 10-2012-0102780 A | | 9/2012 | |
| KR | 10-2012-0119355 A | | 10/2012 | |
| KR | 10-2013-0122507 A | | 11/2013 | |
| WO | WO-2014076487 A1 | * | 5/2014 | .......... B01J 35/0013 |

\* cited by examiner

[FIG. 1]
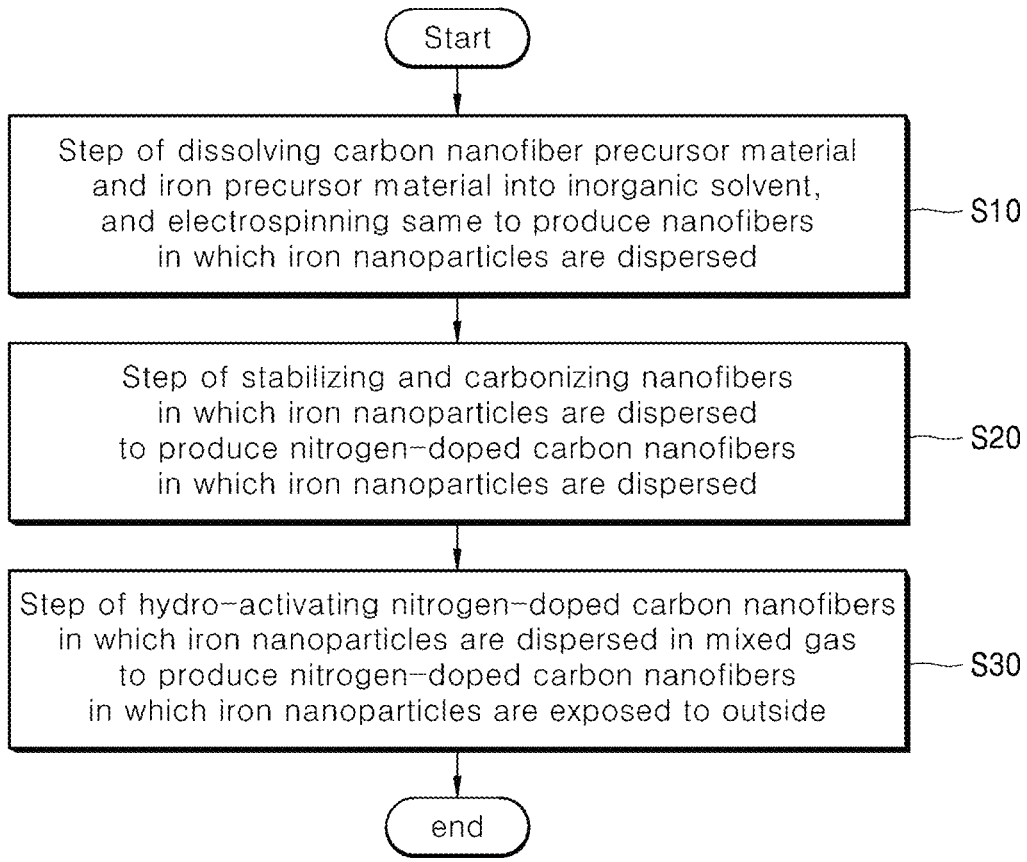
[FIG. 2]
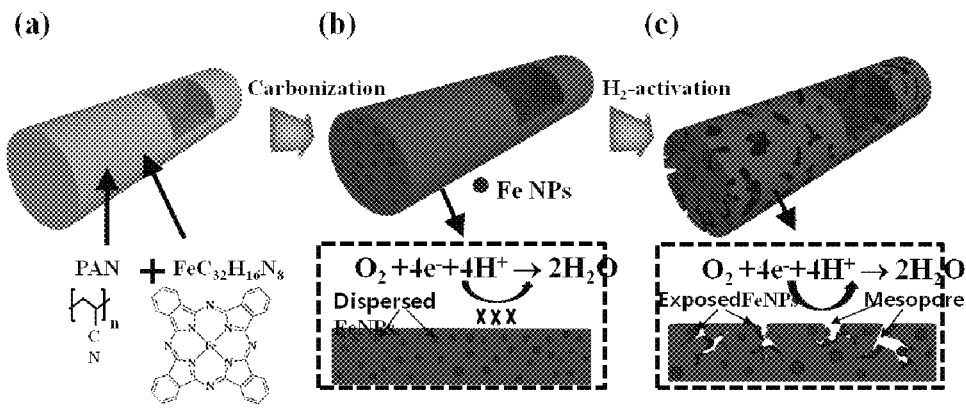

[FIG. 3]
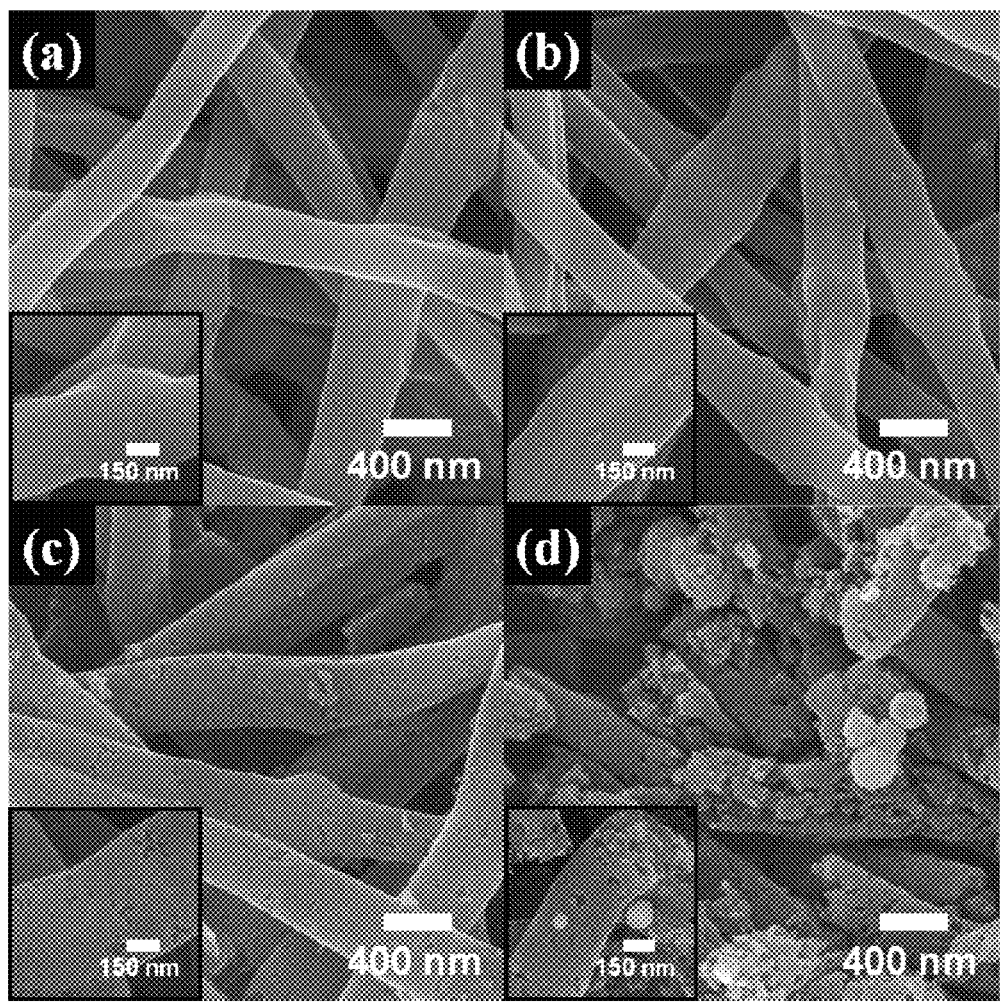

[FIG. 4]
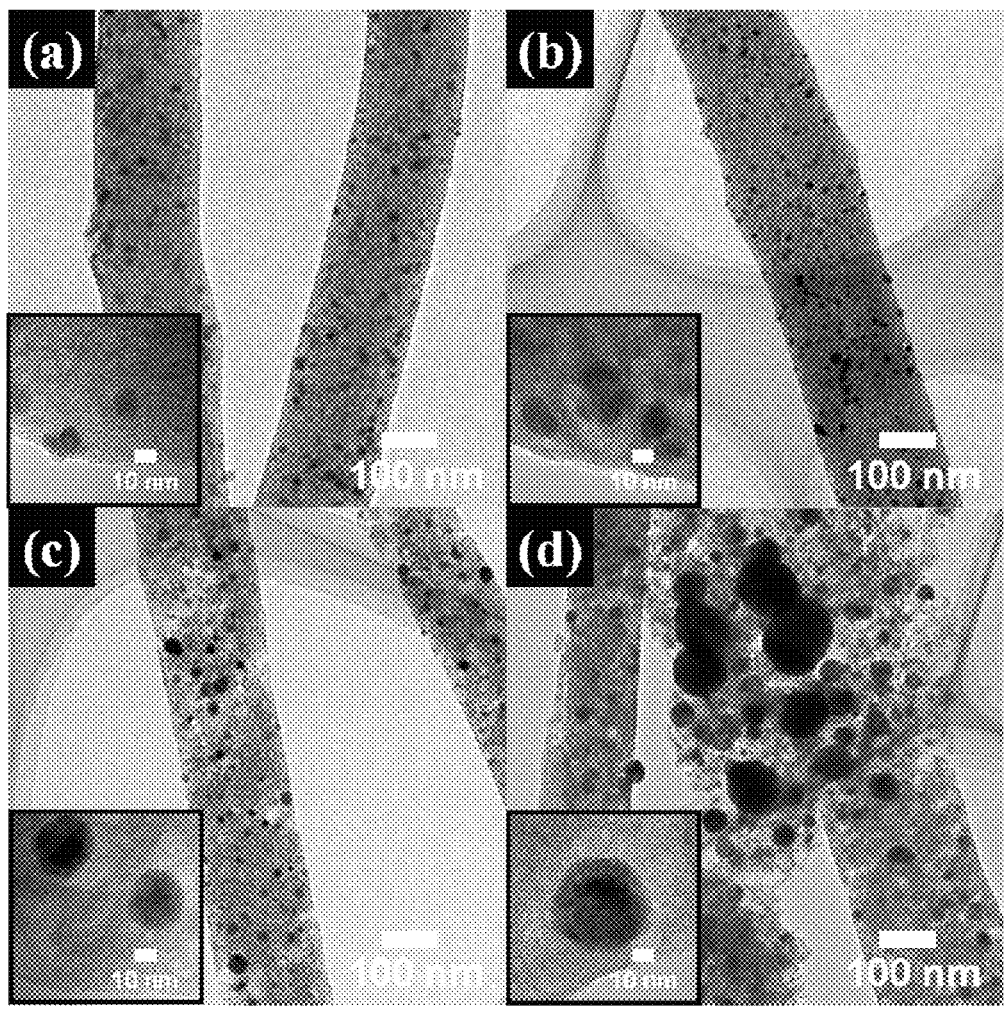

[FIG. 5]
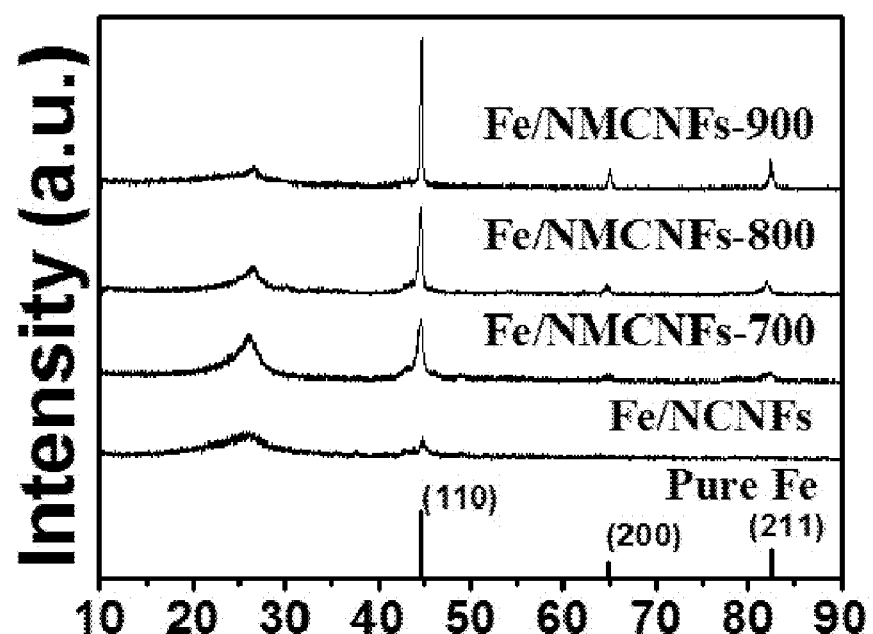

[FIG. 6]
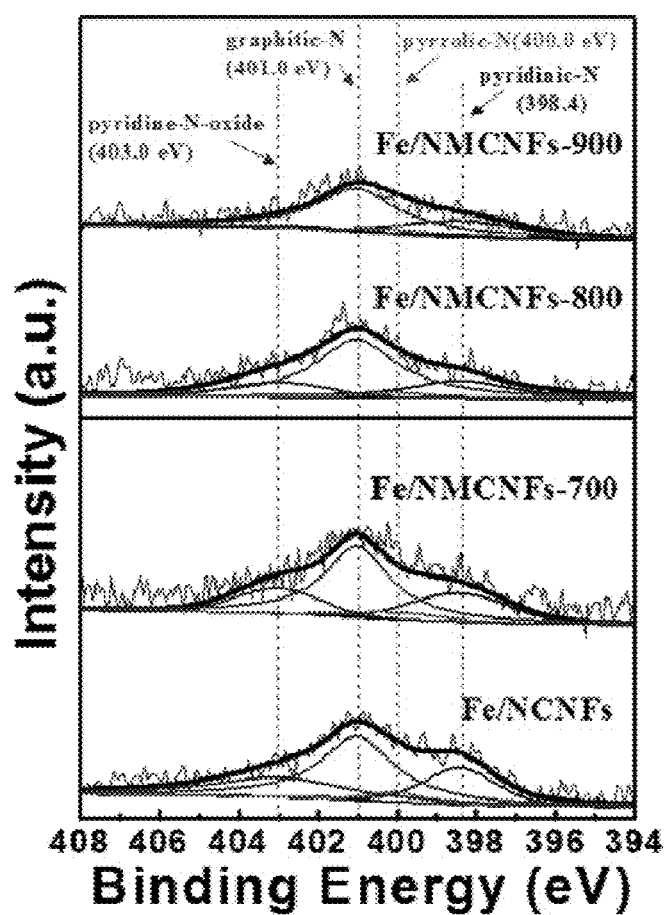

[FIG. 7a]
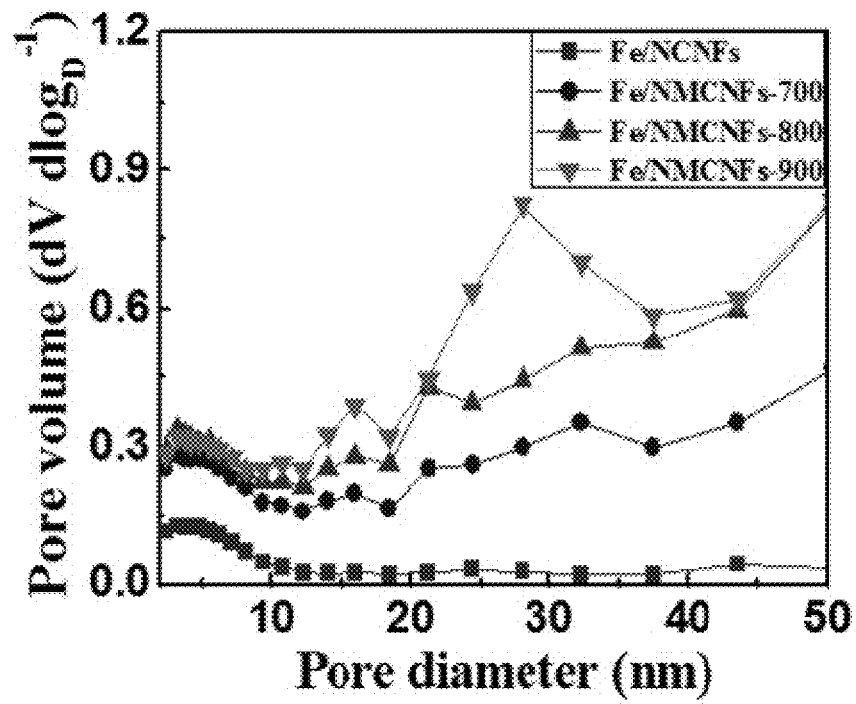
[FIG. 7b]
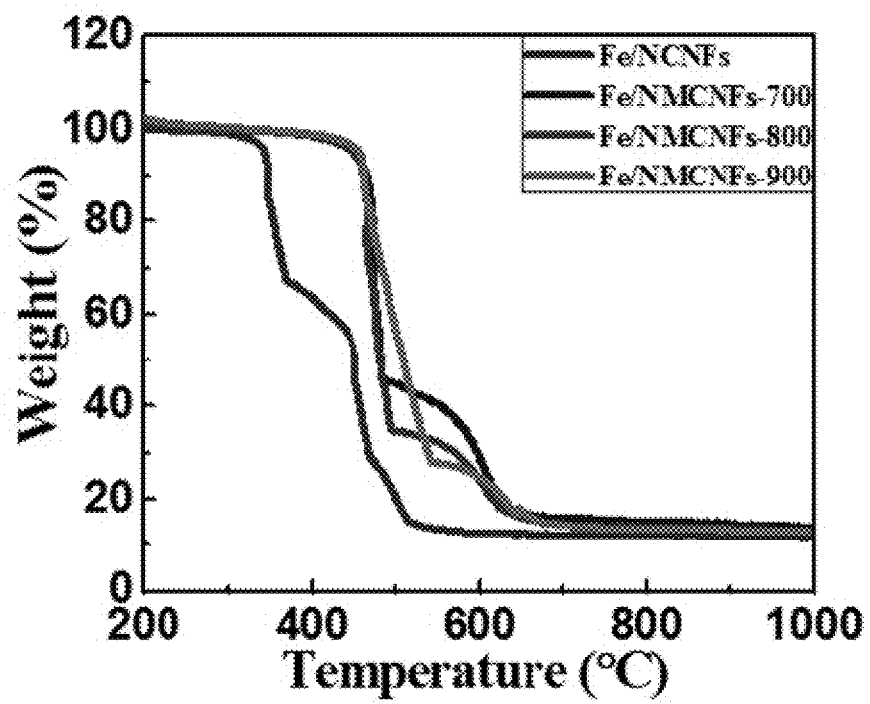

[FIG. 8a]
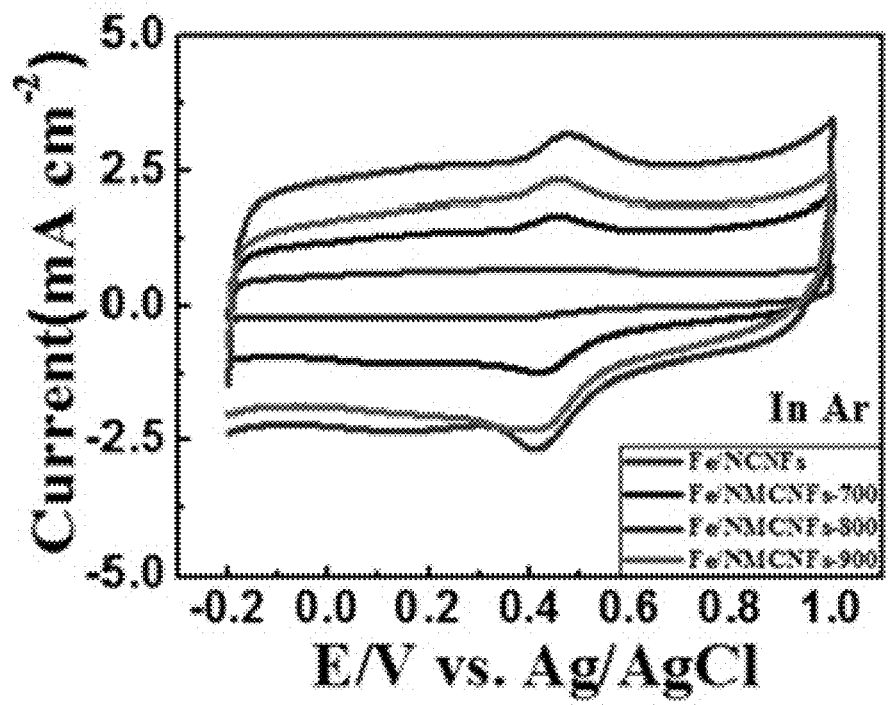
[FIG. 8b]
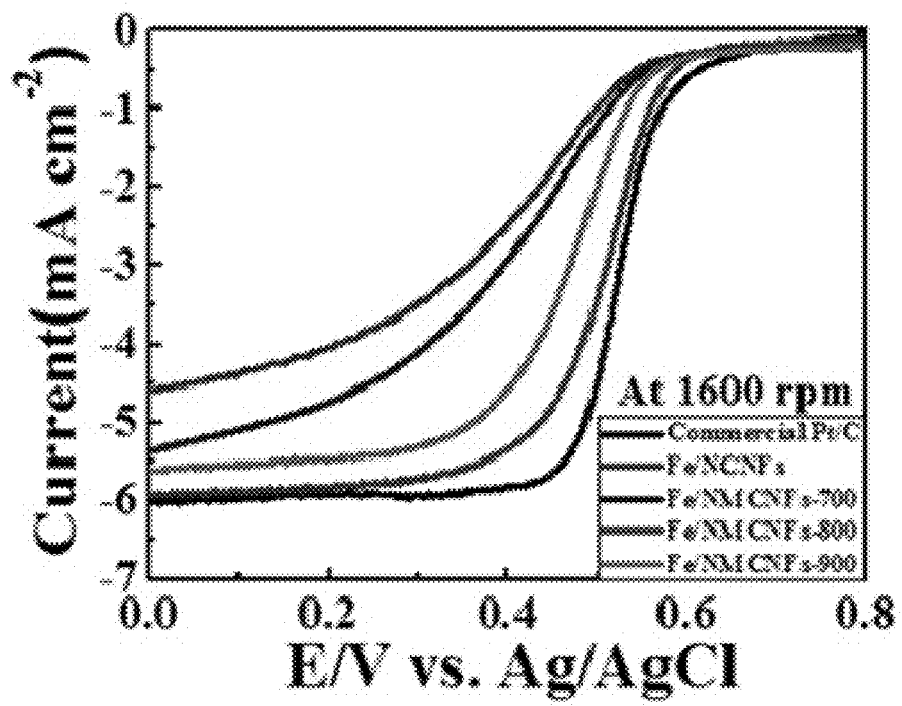

[FIG. 8c]
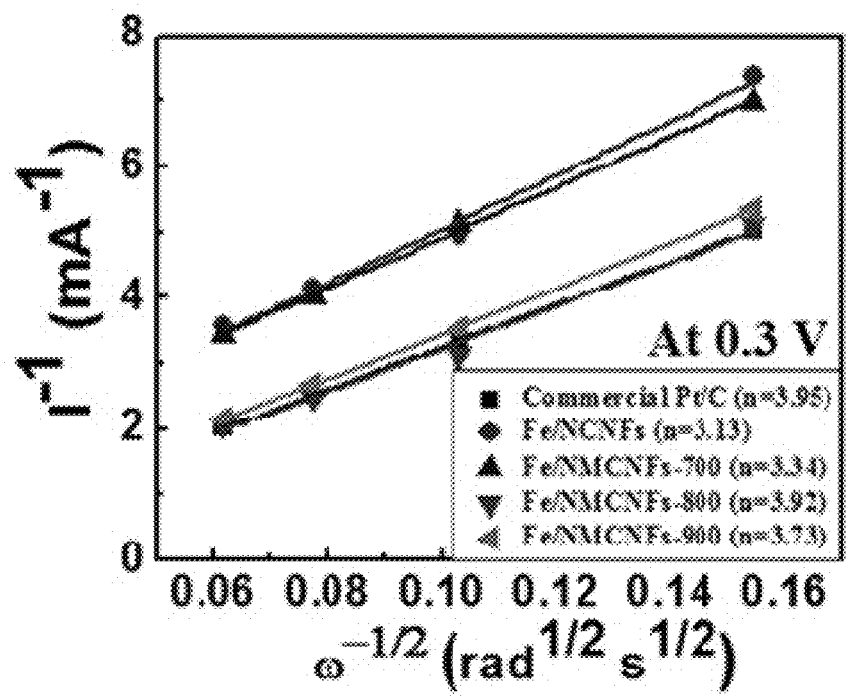
[FIG. 9a]
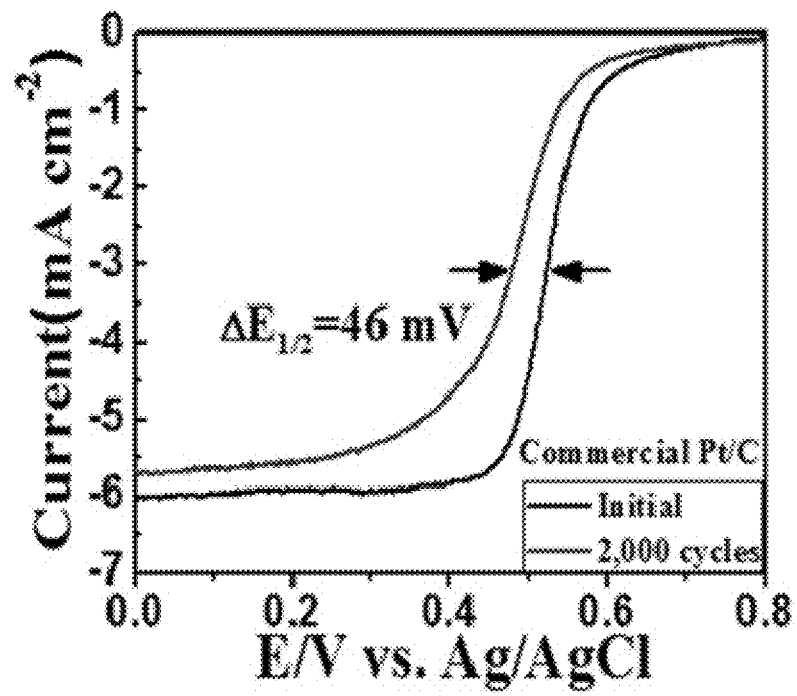

[FIG. 9b]
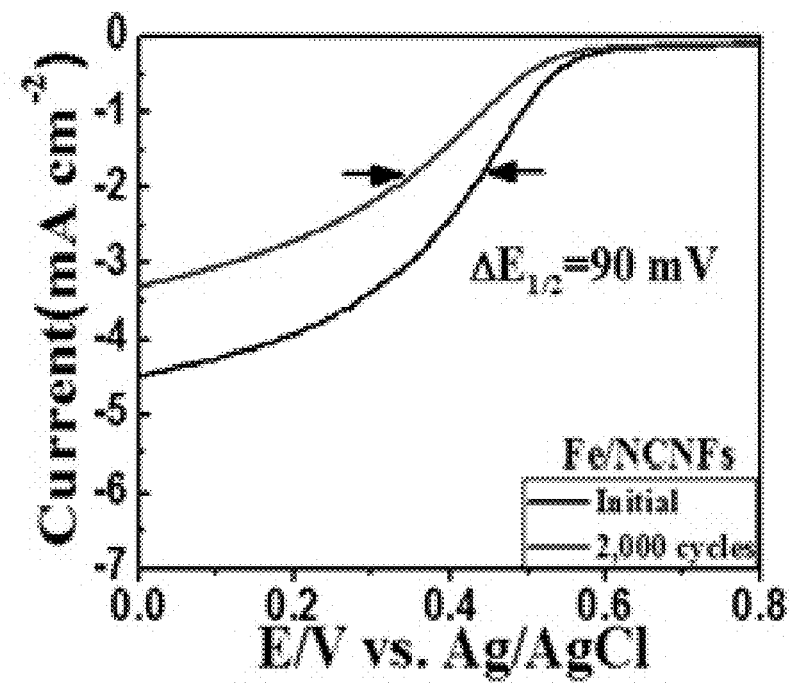
[FIG. 9c]
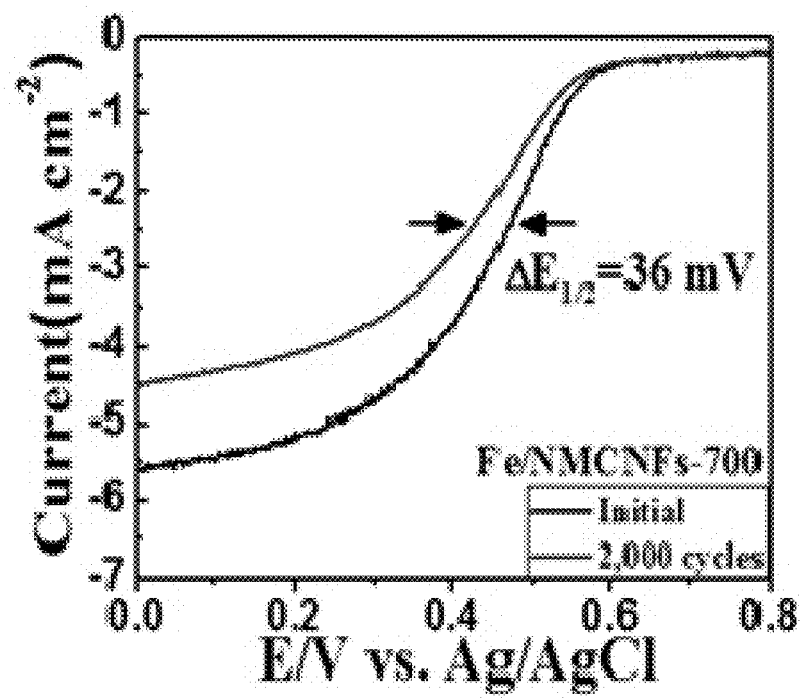

[FIG. 9d]
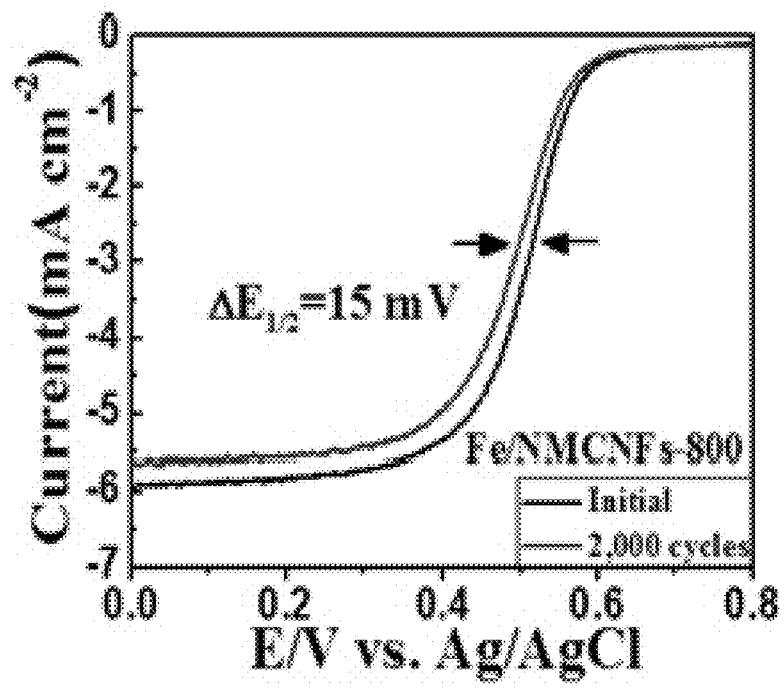
[FIG. 9e]
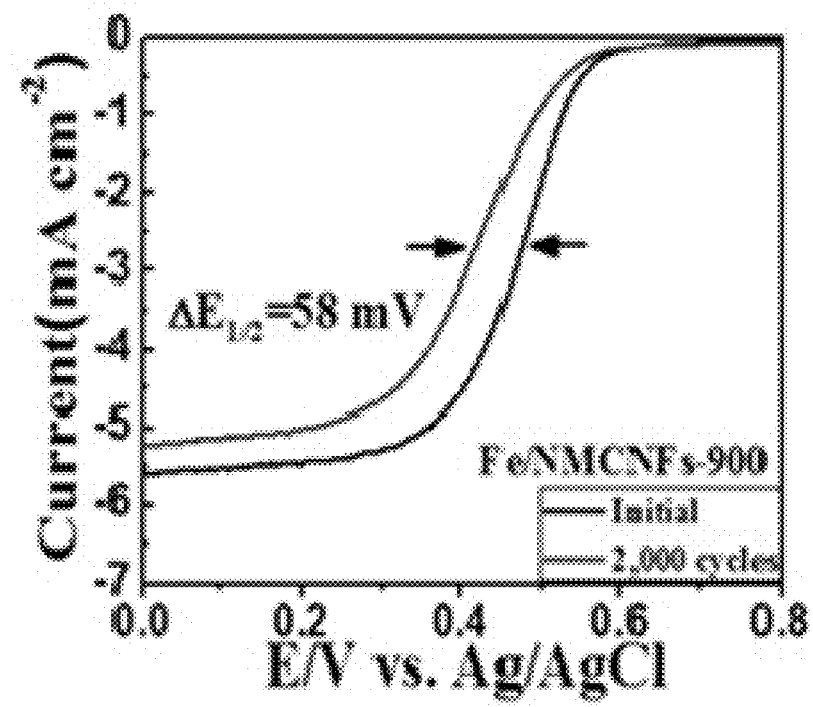

[FIG. 9f]
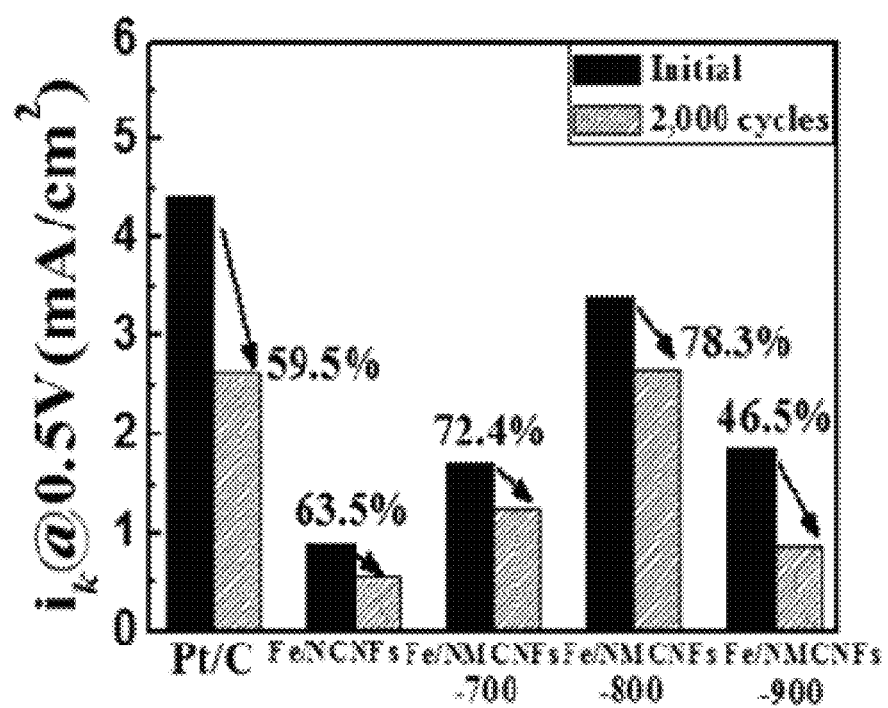

CATALYST FOR OXYGEN REDUCTION ELECTRODE AND METHOD FOR MANUFACTURING SAME

CROSS REFERENCE TO RELATED APPLICATION

This present application is a national stage filing under 35 U.S.C § 371 of PCT application number PCT/KR2015/013400 filed on Dec. 8, 2015 which is based upon and claims the benefit of priority to Korean Patent Application No. 10-2015-0111192 filed on Aug. 6, 2015 in the Korean Intellectual Property Office. The disclosures of the above-listed applications are hereby incorporated by reference herein in their entirety.

TECHNICAL FIELD

The present invention relates to a technique of producing a catalyst for an oxygen reduction electrode, and more particularly, to a non-platinum catalyst for an oxygen reduction electrode and a method for producing the same.

BACKGROUND ART

As oxygen reduction reaction processes have been developed, studies on next-generation batteries such as proton exchange membrane fuel cells and metal air fuel cells are progressing. A negative electrode reaction such as an oxygen reduction reaction has a relatively lower reaction rate than a positive electrode reaction. Therefore, device performance is determined by an oxygen reduction reaction.

A platinum (Pt)-containing catalyst such as a Pt/C catalyst has been widely used in oxygen reduction reactions because of excellent electrocatalytic activity. However, such a Pt catalyst has a high price, limited long-term stability, and a large overvoltage loss. For this reason, it is urgent to develop a non-platinum catalyst with excellent electrocatalytic activity that can replace such a Pt catalyst.

The most promising material of the non-platinum catalysts is a carbon composite doped with a metal and nitrogen (M-N/C; M=Fe, Co). An M-N/C catalyst has excellent catalytic activity, excellent long-term stability, and thus is available as an oxygen reduction reaction catalyst.

In recent years, a method for producing an Fe and N-doped graphene composite (Fe—N/graphene) using pyrolysis with a melamine and Fe-containing precursor. An Fe—N/graphene prepared thereby is known to exhibit excellent oxygen reduction reactivity in an acid electrolyte.

In addition, a catalyst in which $Fe_3C$ nanoparticles are inserted into a nitrogen-doped porous carbon nanosheet has been developed and also exhibits excellent oxygen reduction reactivity in an acid electrolyte. A catalyst in which hollow $Fe_3C$ nanoparticles are embedded in a graphite layer also exhibits high oxygen reduction reaction activity and excellent long-term stability in an acid electrolyte.

However, most of the above-described catalysts have lower catalytic activity than the conventional Pt/C catalyst.

As a prior art associated therewith, an apparatus and method for producing a metal nanoparticle-carbon nanoparticle hybrid nanostructured material using aerosol process technology is disclosed in Korean Patent Unexamined Publication No. 10-2012-0119355 (published on Oct. 31, 2012).

DISCLOSURE

Technical Problem

The present invention is directed to providing a non-platinum catalyst for an oxygen reduction electrode which has similar catalytic activity and excellent long-term stability when compared with a conventional Pt/C catalyst.

The present invention is also directed to providing a suitable method for producing the non-platinum catalyst for an oxygen reduction electrode.

Technical Solution

In one aspect, the catalyst for an oxygen reduction electrode according to the present invention includes iron nanoparticles dispersed in a nitrogen-doped mesoporous carbon nanofiber, in which at least a part of the surface of each iron nanoparticle is exposed to the outside.

Here, each iron nanoparticle may have a size of 10.7 to 19.3 nm. In addition, the non-platinum catalyst for an oxygen reduction electrode may have a total specific surface area of 416.8 to 467.6 $m^2/g$, a total pore volume of 0.63 to 0.88 $cm^3/g$, and an average pore diameter of 6.0 to 7.5 nm.

In another aspect, a method for producing a catalyst for an oxygen reduction electrode according to the present invention includes a step of dissolving a carbon nanofiber precursor material and an iron precursor material in an organic solvent, and electrospinning the resulting mixture to produce nanofibers in which iron nanoparticles are dispersed; a step of stabilizing the produced iron nanoparticle-dispersed nanofibers and carbonizing the resulting nanofibers in a nitrogen-containing atmosphere to produce nitrogen-doped carbon nanofibers in which the iron nanoparticles are dispersed; and a step of hydro-activating the nitrogen-doped carbon nanofibers in which the iron nanoparticles are dispersed by a hydrogen-containing gas to induce agglomeration of the iron nanoparticles and form mesopores into the surface of the nitrogen-doped carbon nanofibers, thereby producing nitrogen-doped carbon nanofibers in which at least a part of the surface of each iron nanoparticle is exposed to the outside.

The hydrogen-containing gas may be used by mixing nitrogen and hydrogen at a volume ratio ($N_2$:$H_2$), ranging from 80 to 90 to 10 to 20. In addition, the hydrogen activation reaction may be performed at 700 to 800° C.

Advantageous Effects

According to the present invention, a catalyst for an oxygen reduction electrode which, when compared to a conventional platinum catalyst, has similar catalytic activity and excellent long-term stability can be provided.

In addition, according to the present invention, a catalyst for an oxygen reduction electrode which can greatly reduce production cost since by excluding platinum and can be prepared by a simple method using electrospinning and carbonization can be provided.

DESCRIPTION OF DRAWINGS

FIG. 1 is a flow chart illustrating a method for producing a non-platinum catalyst for an oxygen reduction electrode, according to the present invention.

FIG. 2 is a process schematic diagram illustrating a method for producing a non-platinum catalyst for an oxygen reduction electrode, according to an example.

FIG. 3 is a scanning electrode microscope image of nitrogen-doped carbon nanofibers in which Fe nanoparticles are dispersed.

FIG. 4 is a transmission electrode microscope image of a nitrogen-doped carbon nanofiber in which Fe nanoparticles are dispersed.

FIG. 5 shows the XRD analysis result for non-platinum catalysts for an oxygen reduction electrode, produced according to an example.

FIG. 6 shows the N1s XPS spectrum result for non-platinum catalysts for an oxygen reduction electrode, produced according to an example.

FIGS. 7A and 7B show the analysis results for pores of non-platinum catalysts for an oxygen reduction electrode, produced according to an example.

FIGS. 8A to 8C show the results of evaluating the electrochemical characteristics of non-platinum catalysts for an oxygen reduction electrode, produced according to an example.

FIGS. 9A to 9F show the results of evaluating the cycling characteristics of non-platinum catalysts for an oxygen reduction electrode, produced according to an example.

MODES OF THE INVENTION

Hereinafter, a catalyst for an oxygen reduction electrode and a method for producing the same according to the present invention will be described in detail with reference to the accompanying drawings.

In the present invention, a catalyst for an oxygen reduction electrode includes nitrogen-doped mesoporous carbon nanofibers and iron nanoparticles, in which the iron nanoparticles are dispersed in the nitrogen-doped mesoporous carbon nanofibers. In addition, according to the present invention, due to a hydrogen activation reaction, the iron nanoparticles are agglomerated and form mesopores on the surface of the nitrogen-doped mesoporous carbon nanofiber, and at least a part of the surface of each iron nanoparticle is exposed to the outside.

The non-platinum catalyst for an oxygen reduction electrode according to the present invention may be effectively used as a catalyst for an oxygen reduction electrode since it exhibits similar catalytic activity to a conventional platinum catalyst, has excellent long-term stability, does not include platinum, and thus greatly reduces production costs.

In the non-platinum catalyst for an oxygen reduction electrode according to the present invention, each iron nanoparticle has a size of 10.7 to 19.3 nm, and the non-platinum catalyst for an oxygen reduction electrode may have a total specific surface area of 416.8 to 467.6 $m^2/g$, a total pore volume of 0.63 to 0.88 $cm^3/g$, and an average pore diameter of 6.0 to 7.5 nm.

In addition, the present invention provides a method for producing a non-platinum catalyst for an oxygen reduction electrode, which includes a method of preparing nitrogen-doped carbon nanofibers in which iron nanoparticles are dispersed by electrospinning, stabilization, and carbonization, and a step of forming mesopores in the surface of the nitrogen-doped mesoporous carbon nanofiber while the iron nanoparticles agglomerate through a hydrogen activation reaction, and therefore at least a part of the surface of the iron nanoparticles is exposed to the outside.

According to the method for producing a non-platinum catalyst for an oxygen reduction electrode of the present invention, the catalyst may be produced by a simple method using electrospinning, and may greatly reduce production cost due to the exclusion of platinum.

FIG. 1 is a flow chart illustrating a method for producing a non-platinum catalyst for an oxygen reduction electrode according to the present invention. Hereinafter, the present invention will be described in detail with reference to FIG. 1.

The method for producing a non-platinum catalyst for an oxygen reduction electrode according to the present invention includes a step S10 of dissolving a carbon nanofiber precursor material and an iron precursor material in an organic solvent, and preparing nanofibers in which iron nanoparticles are dispersed by electrospinning.

Here, the carbon nanofiber precursor material may be one selected from the group consisting of polyacrylonitrile, poly(vinylpyrrolidone), polymethylmethacrylate, and polyethyleneoxide.

In addition, the iron precursor material may use one selected from the group consisting of iron(II) phthalocyanine ($FeC_{32}H_{16}N_8$) and iron nitride ($Fe(NO_3)_3$). The organic solvent may be one selected from the group consisting of N,N-dimethylformamide, tetrahydrofuran, N-methylpyrrolidone, toluene, acetone, and dimethylacetamide.

The iron precursor material and the carbon nanofiber precursor material may be included at a weight ratio of 0.1:1 to 2:1. When the weight of the iron precursor material is less than 0.1 times that of the carbon nanofiber precursor material, due to a low iron content, the performance of the catalyst becomes low. In addition, when the weight of the iron precursor material is more than twice as high as that of the carbon nanofiber precursor material, it is impossible to perform electrospinning because of high viscosity of the solution.

In addition, the electrospinning may be performed at a voltage of 12 to 14 kV, and with a spinning solution supply rate of 0.02 to 0.06 mL/h. When the voltage is less than 12 kV or the spinning solution supply rate is less than 0.02 ml/h, spinning may not be properly performed, and when the voltage is more than 14 kV or the spinning solution supply rate is more than 0.06 ml/h, due to insufficient time for self-arranging nanofibers, there is a possibility of reducing crystallinity.

Next, the method for producing a non-platinum catalyst for an oxygen reduction electrode according to the present invention includes a step S20 of preparing nitrogen-doped carbon nanofibers in which iron nanoparticles are dispersed by carbonizing the iron nanoparticle-dispersed nanofibers prepared above.

Before carbonization, a step of stabilizing the iron nanoparticle-dispersed nanofibers may be further included. The stabilization is preferably performed at 250 to 300° C. When the stabilization is less than 250° C., the carbon precursor may not be stabilized, and when the stabilization is more than 300° C., carbon may combust.

In addition, the carbonization may be performed at 700 to 900° C. in a nitrogen atmosphere. When the carbonization temperature is less than 700° C., non-carbon atoms may not be removed, and when the carbonization temperature is more than 900° C., the carbon nanofibers have very excellent crystallinity. Therefore, the temperature is preferably 900° C. or less with regards to energy efficiency.

The method for producing a non-platinum catalyst for an oxygen reduction electrode according to the present invention includes a step S30 of preparing nitrogen-doped carbon nanofibers in which at least a part of each iron nanoparticle is exposed to the outside by forming mesopores in the surface of the nitrogen-doped carbon nanofiber due to the agglomeration of the iron nanoparticles through a hydrogen activation reaction of the nitrogen-doped carbon nanofibers in which the iron nanoparticles are dispersed in a hydrogen-containing gas atmosphere.

The hydrogen-containing gas is preferably a mixed gas of nitrogen and hydrogen at a volume ratio of 80:20 to 90:10. When the hydrogen content is less than 10%, hydrogen activation may not occur, and when the hydrogen content is more than 20%, a safety issue during a hydrogen activation reaction may occur due to the high hydrogen content.

In addition, the hydrogen activation reaction is preferably performed at 700 to 800° C. When the hydrogen activation reaction is performed at less than 700° C., the non-platinum catalyst for an oxygen reduction electrode may be reduced in catalytic activity and thus unable to be used as a catalyst for an oxygen reduction electrode, and when the hydrogen activation reaction is performed at more than 800° C., the iron nanoparticles agglomerate in large amounts, thereby destroying the structure of the carbon nanofiber and reducing long-term stability.

EXAMPLES

Example 1: Preparation of Nitrogen-Doped Mesoporous Carbon Nanofibers of which Iron Nanoparticles are Exposed to Outside Polyacrylonitrile (PAN) and iron (II) phthalocyanine ($FeC_{32}H_{16}N_8$) were dissolved in a dimethylformamide (DMF) solution while stirring for 3 hours. For electrospinning, the voltage and the supply rate were maintained at 13 kV and 0.03 mL/h, respectively, and a distance between a 23-gauge needle and an aluminum foil collector was fixed at 15 cm.

A nitrogen-doped carbon nanofiber in which iron nanoparticles are dispersed was prepared by stabilizing, at 280° C. for 2 hours, the nanofibers prepared by electrospinning, and carbonizing the stabilized nanofibers in an $N_2$ gas at 800° C. for 2 hours.

Then, a nitrogen-doped mesoporous carbon nanofiber in which iron nanoparticles are exposed to the outside was prepared by performing a hydrogen activation reaction in a mixed gas ($N_2:H_2=90:10$) at 700 to 800° C.

FIG. 2 is a process schematic diagram illustrating a method for producing a non-platinum catalyst for an oxygen reduction electrode according to the example.

As shown in FIG. 2, nanofibers consisting of PAN and $FeC_{32}H_{16}N_8$ were prepared by electrospinning (FIG. 2(a)). In the prepared nanofibers, Fe nanoparticles were formed in a nitrogen-doped carbon nanofiber by carbonization using an $N_2$ gas (FIG. 2(b)). Afterward, the Fe nanoparticles dispersed in the nitrogen-doped carbon nanofiber were exposed to the outside due to the agglomeration of the Fe nanoparticles caused by the hydrogen activation process, thereby forming the carbon nanofibers in a mesoporous structure (FIG. 2(c)).

Experimental Example 1: Morphological and Structural Analyses of Nitrogen-Doped Mesoporous Carbon Nanofibers (Fe/NMCNF) in which Fe Nanoparticles are Exposed to Outside The morphology and structure of the nitrogen-doped mesoporous carbon nanofibers in which Fe nanoparticles are dispersed and exposed to the outside according to the example were analyzed using a field emission scanning electron microscope (FESEM), transmission electron microscope (TEM), X-ray diffraction (XRD), and X-ray photoelectron spectroscopy (XPS), and the results thereof are shown in FIGS. 3, 4, 5 and 6.

FIG. 3 is a scanning electron microscope image of a non-platinum catalyst for an oxygen reduction electrode according to the example. More specifically, FIG. 3(a) is an SEM image of nitrogen-doped carbon nanofibers in which Fe nanoparticles are dispersed, before a hydrogen activation process, FIG. 3(b) is the SEM image of NMCF in which Fe nanoparticles are exposed to the outside and which was prepared by a hydrogen activation process at 700° C., FIG. 3(c) is an SEM image of NMCF in which Fe nanoparticles are exposed to the outside and which was prepared by the hydrogen activation process at 800° C., and FIG. 3(d) is the SEM image of NMCF in which Fe nanoparticles are exposed to the outside and which was prepared by a hydrogen activation process at 900° C.

As shown in FIG. 3, in all samples, the particles have an average diameter of 293 to 323 nm. Fe/NCNF (FIG. 3(a)) and Fe/NMCNF (FIG. 3(b)) subjected to hydrogen activation process at 700° C. had a uniform shape and a smooth surface when compared with the surface in which the Fe nanoparticles agglomerated, which indicates that the Fe nanoparticles were integrated into CNF. Fe/NMCNF (FIG. 3(c)) subjected to the hydrogen activation process at 800° C. had a uniform shape, and due to the porous structure of CNF, the CNF surface was rough. In addition, Fe/NMCNF (FIG. 3(d)) subjected to the hydrogen activation process at 900° C. had an irregular shape due to a porous structure, the CNF surface was rough, and it can be seen that, on the CNF surface, the Fe nanoparticles agglomerated in large amounts. In this case, the nanostructure of the CNF was no longer kept to one-dimension, and was determined as causing degradation of electrochemical performance in the oxygen reduction reaction.

FIG. 4 is a TEM image of a non-platinum catalyst for an oxygen reduction electrode according to the example. More specifically, FIG. 4(a) is a TEM image of the nitrogen-doped carbon nanofiber (NMCNF) in which the Fe nanoparticles are dispersed, before the hydrogen activation process, FIG. 4(b) is the TEM image of NMCNF in which the Fe nanoparticles are exposed to the outside, prepared by the hydrogen activation process at 700° C., FIG. 4(c) is a TEM image of NMCNF in which the Fe nanoparticles are exposed to the outside, prepared by the hydrogen activation process at 800° C., and FIG. 4(d) is the TEM image of NMCNF in which the Fe nanoparticles are exposed to the outside, prepared by the hydrogen activation process at 900° C.

As shown in FIG. 4, it can be seen that, in all samples, relatively dark spots indicated integration into CNF, and these dark spots were identified as Fe nanoparticles.

In the nitrogen-doped carbon nanofiber in which the Fe nanoparticles are dispersed, before the hydrogen activation process (FIG. 4(a)), an Fe nanoparticle size was 6.1 to 7.7 nm, in NMCNF in which the Fe nanoparticles are exposed to the outside, prepared by the hydrogen activation process at 700° C. (FIG. 4(b)), an Fe nanoparticle size was 10.7 to 12.1 nm, in NMCNF in which the Fe nanoparticles are exposed to the outside, prepared by the hydrogen activation process at 800° C. (FIG. 4(c)), an Fe nanoparticle size was 17.9 to 19.3 nm, and in NMCNF in which the Fe nanoparticles are exposed to the outside, prepared by the hydrogen activation process at 900° C. (FIG. 4(d)), an Fe nanoparticle size was 39.1 to 93.5 nm. The higher the temperature of hydrogen activation, the larger the size of the Fe nanoparticle.

Meanwhile, NMCNF in which the Fe nanoparticles are exposed to the outside, prepared by the hydrogen activation process at 800° C. (FIG. 4(c)), has a unique structure due to the formation of mesoporous CNF when compared with the presence of the Fe nanoparticles exposed in NMCNF. However, in NMCNF in which the Fe nanoparticles are exposed to the outside, prepared by the hydrogen activation process at 900° C. (FIG. 4(d)), the Fe nanoparticles which were placed in or exposed to the surface of the mesoporous CNF agglomerated in large amounts and thus had a size of 39.1 to 93.5 nm. Due to the agglomerated Fe nanoparticles, an oxygen reduction reaction was very low in an acid electrolyte.

In addition, as shown in the SEM and TEM images, the Fe nanoparticles extracted and agglomerated by the hydrogen activation process create the mesoporous structure in CNF. That is, the hydrogen activation process allows metal phase extraction and agglomeration to thermodynamically create a more stable phase, and thus the Fe nanoparticles become exposed to the CNF surface.

FIG. 5 shows the XRD analysis result for non-platinum catalysts for an oxygen reduction electrode, produced according to the example. In FIG. 5, Fe/NCNF is a nitrogen-doped carbon nanofiber in which Fe nanoparticles are dispersed, before a hydrogen activation process, Fe/NMCNF-700 is NMCNF in which Fe nanoparticles are exposed to the outside, prepared by a hydrogen activation process at 700° C., Fe/NMCNF-800 is NMCNF in which Fe nanoparticles are exposed to the outside, prepared by a hydrogen activation process at 800° C., and Fe/NMCNF-900 is NMCNF in which Fe nanoparticles are exposed to the outside, prepared by a hydrogen activation process at 900° C.

As shown in FIG. 5, in all samples, peaks were shown at approximately 25°, corresponding to a graphite side (002). The major diffraction peaks of all samples were observed at 44.7°, 65.0°, and 82.4°, which respectively correspond to sides (110), (200), and (211).

FIG. 6 shows the N1s XPS spectra of non-platinum catalysts for an oxygen reduction electrode, produced according to an exemplary embodiment. General high-magnification N1s peaks were properly adjusted to four different nitrogens, such as pyridinic-N-oxide N (403.0±0.2 eV), graphitic-N (401.0±0.2 eV), pyrrolic-N (400.0±0.2 eV), and pyridinic-N (398.4±0.2 eV).

Generally, graphitic-N and pyrrolic-N are inclined to become active sites in the oxygen reduction reaction. As an $H_2$ activation temperature was increased, the graphitic-N content was gradually increased from 48.2 wt % (Fe/NCNF) to 55.9 wt % (Fe/NMCNF-700), 61.6 wt % (Fe/NMCNF-800), and 67.3 wt % (Fe/NMCNF-900). Carbon recrystallization including graphite growth may occur during a hydrogen activation process caused by an active hydrogen atom. In addition, the pyrrolic-N contents in all samples were observed at similar values regardless of an activation temperature. The increased graphitic-N content affected the electrochemical performance in the oxygen reduction reaction.

Experimental Example 2: Analyses of the Specific Surface Area, Total Pore Volume, Average Pore Diameter, and Pore Volume Fraction of Nitrogen-Doped Mesoporous Carbon Nanofiber in which Fe Nanoparticles are Exposed to the Outside The specific surface area, total pore volume, average pore diameter, and pore volume fraction of the non-platinum catalyst for an oxygen reduction electrode produced according to the example were measured using Brunauer-Emmett-Teller (BET), Barrett-Joyner-Halenda (BJH), and thermogravimetric analysis (TGA), and the results thereof are shown in Table 1, and FIGS. 7A and 7B.

TABLE 1

| Sample | $S_{SET}$ (m²/g) | Total pore volume (cm³/g) | Average pore diameter (nm) | Pore volume fraction | |
|---|---|---|---|---|---|
| | | | | $V_{micro}$ (%) | $V_{meso}$ (%) |
| Fe/NCNF | 294.9 | 0.21 | 2.9 | 68.4 | 31.6 |
| Fe/NMCNF-700 | 416.8 | 0.63 | 6.0 | 27.8 | 72.2 |
| Fe/NMCNF-800 | 467.6 | 0.88 | 7.5 | 20.9 | 79.1 |
| Fe/NMCNF-900 | 468.9 | 0.95 | 8.1 | 17.1 | 82.9 |

As shown in Table 1, as the $H_2$-activation temperature increased, the specific surface area, total pore volume, average pore diameter, and mesopore volume fraction were gradually increased. This is because the Fe nanoparticles in CNF were extracted and agglomerated in the hydrogen activation process. Particularly, the pore size distribution and mesopore (pore diameter of 2 to 50 nm) volume fraction are very critical factors for the exposure of the Fe nanoparticles in CNF.

FIG. 7A is a graph showing the pore size distribution and mesopore volume for the non-platinum catalysts for an oxygen reduction electrode, produced according to the example. Here, the pore size was 2 to 50 nm. The mesopore volume fraction of a sample after hydrogen activation was increased by increasing an activation temperature, which corresponds to the BET result. The increase in mesopores of the sample after the hydrogen activation process may shorten a diffraction pathway between the catalyst and an electrolyte and reduce a resistance.

FIG. 7B shows the thermogravimetric analysis (TGA) results for non-platinum catalysts for an oxygen reduction electrode, produced according to an exemplary embodiment. For the thermogravimetric analysis (TGA), content changes and thermal stability were examined by heating samples in an air atmosphere at a heating rate of 10° C./min at 200 to 1000° C. All samples had a similar weight loss of approximately 87%, which shows that amounts of the Fe nanoparticles in CNF were almost the same. In addition, the initial weight loss of Fe/NMCNF-700, Fe/NMCNF-800, and Fe/NMCNF-900 started from approximately 465° C., and exhibited high thermal stability due to graphite growth in the hydrogen activation process when compared with Fe/NCNF.

Experimental Example 3: Analysis of Oxygen Reduction Reaction for Nitrogen-Doped Mesoporous Carbon Nanofiber in which Fe Nanoparticles are Exposed to the Outside The oxygen reduction reactivity of a non-platinum catalyst for an oxygen reduction electrode, produced according to an exemplary embodiment, was subjected to cyclic voltammetry (CV), linear scanning voltammetry (LSV), and Koutecky-Levich (K-L), and the results thereof are shown in FIGS. 8A to 8C.

FIG. 8A is the analysis result of cyclic voltammetry (CV) for the non-platinum catalysts for an oxygen reduction electrode. produced according to the example. The analysis using cyclic voltammetry (CV) was measured in an Ar-saturated 0.1M $HClO_4$ electrolyte from −0.2 to 1.0V at a scan rate of 50 mV/s. Referring to FIG. 8A, for CV corresponding to Fe(II)/Fe(III) redox, a pair of peaks was observed at 0.3 to 0.4V. The redox reaction of an Fe-based material is directly associated with high catalytic activity in the oxygen reduction reaction. Fe/NMCNF-800 exhibits the widest capacitive current when compared with other samples, which indicates that the electrochemically available area is wide. The improvement in performance with respect to the capacitive current indicates that Fe nanoparticles in mesoporous CNF are optimally exposed by a hydrogen activation process at 800° C.

FIG. 8B is the analysis result of linear scanning voltammetry (LSV) for the non-platinum catalysts for an oxygen reduction electrode, produced according to the example. The linear scanning voltammetry (LSV) was measured in an O2-saturated 0.1M $HClO_4$ electrolyte using a rotating disk electrode (RDE) at 1,600 rpm. As shown in FIG. 8B, all samples exhibited excellent oxygen reduction reactivity, and particularly, the onset potential of the oxygen reduction reaction indicates the electrocatalytic performance of the catalyst. Starting potentials of Pt/C, Fe/NCNF. Fe/NMCNF-700, Fe/NMCNF-800 and Fe/NMCNF-900 were 0.63V, 0.52V, 0.53V, 0.59V and 0.56V, respectively, and therefore the highest starting potential was detected by performing the hydrogen activation reaction at 800° C.

FIG. 8C is a Koutecky-Levich graph for non-platinum catalysts for an oxygen reduction electrode, produced according to the example. Calculations were performed at 0.3V with Pt/C, Fe/NCNF in the form present before the hydrogen activation process, and Fe/NMCNFa, used herein, which were subjected to hydrogen activation at 700° C., 800° C., and 900° C. The n values of all samples were measured at 3.95 for Pt/C, 3.13 for Fe/NCNF, 3.34 for Fe/NMCNF-700, 3.92 for Fe/NMCNF-800, and 3.73 for Fe/NMCNF-900. The high n values of Pt/C and Fe/NMCNF-800 indicate that there were four electron pathways in an acid electrolyte.

Experimental Example 4: Analysis of Long-Term Stability of Nitrogen-Doped Mesoporous Carbon Nanofiber in which Fe Nanoparticles are Exposed to Outside The long-term stability of the non-platinum catalysts for an oxygen reduction electrode, produced according to the example, was analyzed for 2,000 cycles at 0.4 to 0.9 V, and the results thereof are shown in FIGS. 9A to 9E. FIG. 9A shows the cycling result for the Pt/C catalyst used herein, FIG. 9B shows the cycling result for Fe/NCNF before the hydrogen activation process, FIG. 9C shows the cycling result for Fe/NMCNF-700 produced by the hydrogen activation process at 700° C., FIG. 9D shows the cycling result for Fe/NMCNF-800 produced by the hydrogen activation process at 800° C., and FIG. 9E shows the cycling result for Fe/NMCNF-900 produced by the hydrogen activation process at 900° C.

Referring to FIGS. 9A to 9E, the potential drops for E1/2 were 46 mV for Pt/C used herein, 90 mV for Fe/NCNF before the hydrogen activation process, 36 mV for Fe/NMCNF-700, 15 mV for Fe/NMCNF-800, and 58 mV for Fe/NMCNF-900. Particularly, it was seen that Fe/NMCNF-800 shows the lowest potential drop for E1/2, and thus exhibits excellent long-term stability in the oxygen reduction reaction.

FIG. 9F is the graph showing the kinetic current densities calculated before and after 2,000 cycles at 0.5 V of the non-platinum catalysts for an oxygen reduction electrode, produced according to the example. Referring to FIG. 9F, before cycling measurement, the kinetic current density of Pt/C used herein was 4.42 mA/cm$^2$, which was higher than Fe/NMCNF-800 (3.41 mA/cm$^2$). However, after 2,000 cycles, Fe/NMCNF-800 exhibited a kinetic current density of 2.67 mA/cm$^2$ and an excellent kinetic current density retention of 78.3%. Meanwhile, Pt/C exhibited a kinetic current density of 2.63 mA/cm$^2$ and an excellent kinetic current density retention of 59.5%.

Such results show that Fe/NMCNF-800 has the best long-term stability in the oxygen reduction reaction. It was determined that the reasons why Fe/NMCNF-800 produced according to the example has excellent oxygen reduction reactivity and long-term stability are that evenly-dispersed Fe nanoparticles are exposed in N-doped CNF and mesoporous CNF in a uniform shape is maintained.

Meanwhile, after 2,000 cycles, since Fe nanoparticles agglomerate in large amounts in Fe/NMCNF-900, mesoporous CNF was destroyed, a kinetic current density was low at 0.86 mA/cm$^2$, and kinetic current density retention was also low at 46.5%. For this reason, the hydrogen activation reaction is preferably performed at up to 800° C.

While the present invention has been described with reference to exemplary embodiments, it might be understood by those of ordinary skill in the art that the present invention is changed or modified in various forms. Such changes and modifications might be included in the present invention without departing from the scope of the present invention. Accordingly, the scope of the present invention should be determined by the following claims.

The invention claimed is:

1. A method for producing a non-platinum catalyst for an oxygen reduction electrode, comprising:
   a step of dissolving a carbon nanofiber precursor material and an iron precursor material in an organic solvent, and electrospinning the resulting mixture to produce nanofibers in which iron nanoparticles are dispersed;
   a step of stabilizing the produced iron nanoparticle-dispersed nanofibers and carbonizing the resulting nanofibers in a nitrogen-containing atmosphere to produce nitrogen-doped carbon nanofibers in which the iron nanoparticles are dispersed; and
   a step of producing nitrogen-doped carbon nanofibers in which at least a part of the surface of each iron nanoparticle is exposed to the outside by forming mesopores in the surface of the nitrogen-doped carbon nanofibers while the iron nanoparticles agglomerate through a hydrogen activation reaction of the nitrogen-doped carbon nanofibers in which the iron nanoparticles are dispersed by a hydrogen-containing gas, wherein the hydrogen-containing gas consists of nitrogen and hydrogen, and wherein the hydrogen activation reaction is performed at a temperature ranging from 700° C. to 800° C.

2. The method of claim 1, wherein the carbon nanofiber precursor material is one selected from the group consisting of polyacrylonitrile, poly(vinylpyrrolidone), polymethylmethacrylate, and polyethyleneoxide.

3. The method of claim 1, wherein the iron precursor material is iron(II) phthalocyanine ($FeC_{32}H_{16}N_8$) and iron nitride ($Fe(NO_3)_3$).

4. The method of claim 1, wherein the stabilization is performed at 250 to 300° C.

5. The method of claim 1, wherein the carbonization is performed in a nitrogen atmosphere at 700 to 900° C.

6. The method of claim 1, wherein between a volume ratio between the nitrogen and the hydrogen in the hydrogen-containing gas ranges from 80:20 to 90:10.

* * * * *